United States Patent
Narita et al.

(10) Patent No.: US 11,626,130 B2
(45) Date of Patent: Apr. 11, 2023

(54) MAGNETIC HEAD WITH STACKED BODY HAVING SPECIFIED COMPOSITIONS OF MAGNETIC AND NONMAGNETIC LAYERS THEREOF

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Naoyuki Narita, Funabashi (JP); Masayuki Takagishi, Kunitachi (JP); Hitoshi Iwasaki, Nerima (JP); Tomoyuki Maeda, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/859,041

(22) Filed: Jul. 7, 2022

(65) Prior Publication Data

US 2022/0335968 A1 Oct. 20, 2022

Related U.S. Application Data

(62) Division of application No. 17/177,274, filed on Feb. 17, 2021, now Pat. No. 11,417,355.

(30) Foreign Application Priority Data

Jun. 1, 2020 (JP) .............................. JP2020-095414

(51) Int. Cl.
*G11B 5/235* (2006.01)
*G11B 5/31* (2006.01)
(Continued)

(52) U.S. Cl.
CPC ............ *G11B 5/235* (2013.01); *G11B 5/1278* (2013.01); *G11B 5/314* (2013.01); *G11B 5/3146* (2013.01); *G11B 5/667* (2013.01)

(58) Field of Classification Search
None
See application file for complete search history.

(56) References Cited

U.S. PATENT DOCUMENTS

| 10,978,098 B1 | 4/2021 | Narita et al. |
| 11,004,464 B1 | 5/2021 | Suto et al. |

(Continued)

FOREIGN PATENT DOCUMENTS

| JP | 2018-147540 A | 9/2018 |
| JP | 2018-156709 A | 10/2018 |

(Continued)

*Primary Examiner* — Craig A. Renner
(74) *Attorney, Agent, or Firm* — Oblon, McClelland, Maier & Neustadt, L.L.P.

(57) ABSTRACT

According to one embodiment, a magnetic head includes a first magnetic pole, a second magnetic pole, and a stacked body provided between the first and second magnetic poles. The stacked body includes a first magnetic layer, a second magnetic layer provided between the first magnetic pole and the first magnetic layer, a third magnetic layer provided between the first magnetic pole and the second magnetic layer, a first nonmagnetic layer provided between the first magnetic layer and the second magnetic pole, a second nonmagnetic layer provided between the second and first magnetic layers, and a third nonmagnetic layer provided between the third and second magnetic layers. The third magnetic layer includes first and second elements. The first and second magnetic layers do not include the second element. Or concentrations of the second element in the first and second magnetic layers are less than in the third magnetic layer.

15 Claims, 10 Drawing Sheets

(51) Int. Cl.
  *G11B 5/127* (2006.01)
  *G11B 5/667* (2006.01)

(56) References Cited

U.S. PATENT DOCUMENTS

| | | |
|---|---|---|
| 2008/0268291 A1 | 10/2008 | Akiyama et al. |
| 2012/0134054 A1 | 5/2012 | Takeo et al. |
| 2012/0154952 A1 | 6/2012 | Yamada et al. |
| 2012/0176702 A1 | 7/2012 | Yamada et al. |
| 2013/0050869 A1 | 2/2013 | Nagasaka et al. |
| 2018/0261241 A1 | 9/2018 | Narita et al. |
| 2018/0268848 A1 | 9/2018 | Narita et al. |
| 2019/0088274 A1 | 3/2019 | Narita et al. |
| 2019/0088275 A1 | 3/2019 | Narita et al. |
| 2020/0058322 A1 | 2/2020 | Narita et al. |
| 2020/0075045 A1 | 3/2020 | Narita et al. |
| 2020/0075047 A1 | 3/2020 | Narita et al. |
| 2020/0082845 A1 | 3/2020 | Suto et al. |
| 2020/0090685 A1 | 3/2020 | Takagishi et al. |
| 2020/0168244 A1 | 5/2020 | Suto et al. |
| 2020/0294535 A1 | 9/2020 | Narita et al. |
| 2021/0104257 A1 | 4/2021 | Iwasaki et al. |
| 2021/0142821 A1 | 5/2021 | Iwasaki et al. |
| 2021/0217440 A1 | 7/2021 | Suto et al. |

FOREIGN PATENT DOCUMENTS

| | | |
|---|---|---|
| JP | 2019-057337 A | 4/2019 |
| JP | 2019-057338 A | 4/2019 |
| JP | 2020-030871 A | 2/2020 |
| JP | 2020-038742 A | 3/2020 |
| JP | 2020-038743 A | 3/2020 |
| JP | 2020-042877 A | 3/2020 |
| JP | 2020-047336 A | 3/2020 |
| JP | 2020-087492 A | 6/2020 |
| JP | 2020-149737 A | 9/2020 |
| JP | 2021-61076 A | 4/2021 |
| JP | 2021-77435 A | 5/2021 |
| JP | 2021-111428 A | 8/2021 |
| JP | 2021-144784 A | 9/2021 |
| JP | 2021-149979 A | 9/2021 |

MAGNETIC HEAD WITH STACKED BODY HAVING SPECIFIED COMPOSITIONS OF MAGNETIC AND NONMAGNETIC LAYERS THEREOF

CROSS-REFERENCE TO RELATED APPLICATIONS

This application is a divisional of U.S. application Ser. No. 17/177,274, filed on Feb. 17, 2021, which is based upon and claims the benefit of priority from Japanese Patent Application No. 2020-095414, filed on Jun. 1, 2020; the entire contents of which are incorporated herein by reference.

FIELD

Embodiments herein generally relate to a magnetic head and a magnetic recording device.

BACKGROUND

Information is recorded in a magnetic recording medium such as a HDD (Hard Disk Drive) or the like by using a magnetic head. It is desirable to increase the recording density of the magnetic recording device.

DETAILED DESCRIPTION

Figure 1:
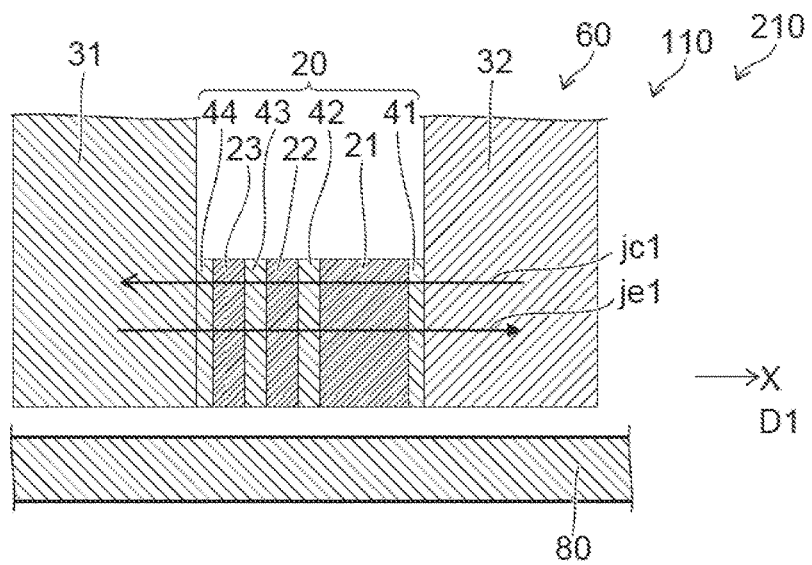
FIG. 1 is a schematic cross-sectional view illustrating a portion of a magnetic recording device according to a first embodiment.

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the first magnetic pole and the first magnetic layer, a third magnetic layer provided between the first magnetic pole and the second magnetic layer, a first nonmagnetic layer provided between the first magnetic layer and the second magnetic pole, a second nonmagnetic layer provided between the second magnetic layer and the first magnetic layer, and a third nonmagnetic layer provided between the third magnetic layer and the second magnetic layer. The first magnetic layer includes at least one of Fe, Co, or Ni. The second magnetic layer includes at least one of Fe, Co, or Ni. The third magnetic layer includes a first element including at least one of Fe, Co, or Ni, and a second element including at least one selected from the group consisting of Cr, V, Mn, Ti, and Sc. The first magnetic layer and the second magnetic layer do not include the second element. Or concentrations of the second element in the first and second magnetic layers are less than a concentration of the second element in the third magnetic layer. The first nonmagnetic layer includes at least one selected from the group consisting of Cu, Ag, Au, Al, and Cr. The second nonmagnetic layer includes at least one selected from the group consisting of Ta, Pt, W, Mo, Ir, Ru, Tb, Rh, Cr, and Pd. The third nonmagnetic layer includes at least one selected from the group consisting of Cu, Ag, Au, Al, and Cr.

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the first magnetic pole and the first magnetic layer, a third magnetic layer provided between the first magnetic pole and the second magnetic layer, a first nonmagnetic layer provided between the first magnetic layer and the second magnetic pole, a second nonmagnetic layer provided between the second magnetic layer and the first magnetic layer, and a third nonmagnetic layer provided between the third magnetic layer and the second magnetic layer. The first magnetic layer includes a first element including at least one of Fe, Co, or Ni, and a second element including at least one selected from the group consisting of Cr, V, Mn, Ti, and Sc. The second magnetic layer includes at least one of Fe, Co, or Ni. The second magnetic layer does not include the second element. Or a concentration of the second element in the second magnetic layer is less than a concentration of the second element in the first magnetic layer. The third magnetic layer includes a third element including at least one of Fe, Co, or Ni, and a fourth element including at least one selected from the group consisting of Cr, V, Mn, Ti, and Sc. The second magnetic layer does not include the fourth element. Or a concentration of the fourth element in the second magnetic layer is less than a concentration of the fourth element in the third magnetic layer. The first nonmagnetic layer includes at least one selected from the group consisting of Cu, Ag, Au, Al, and Cr. The second nonmagnetic layer includes at least one selected from the group consisting of Cu, Ag, Au, Al, and Cr. The third nonmagnetic layer includes at least one selected from the group consisting of Cu, Ag, Au, Al, and Cr.

According to one embodiment, a magnetic recording device includes any one of the magnetic head described above, a magnetic recording medium, and an electrical circuit. An electrical resistance of the stacked body is a first resistance when a current flowing in the stacked body is a first current. The electrical resistance of the stacked body is a second resistance when the current flowing in the stacked body is a second current. The second current is greater than the first current. The second resistance is greater than the first resistance. The electrical resistance of the stacked body oscillates when the current flowing in the stacked body is a third current. The third current is between the first current and the second current. The electrical circuit is configured to supply the second current to the stacked body in a recording operation of using the magnetic head to record information in the magnetic recording medium.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a portion of a magnetic recording device according to a first embodiment.

Figure 2:
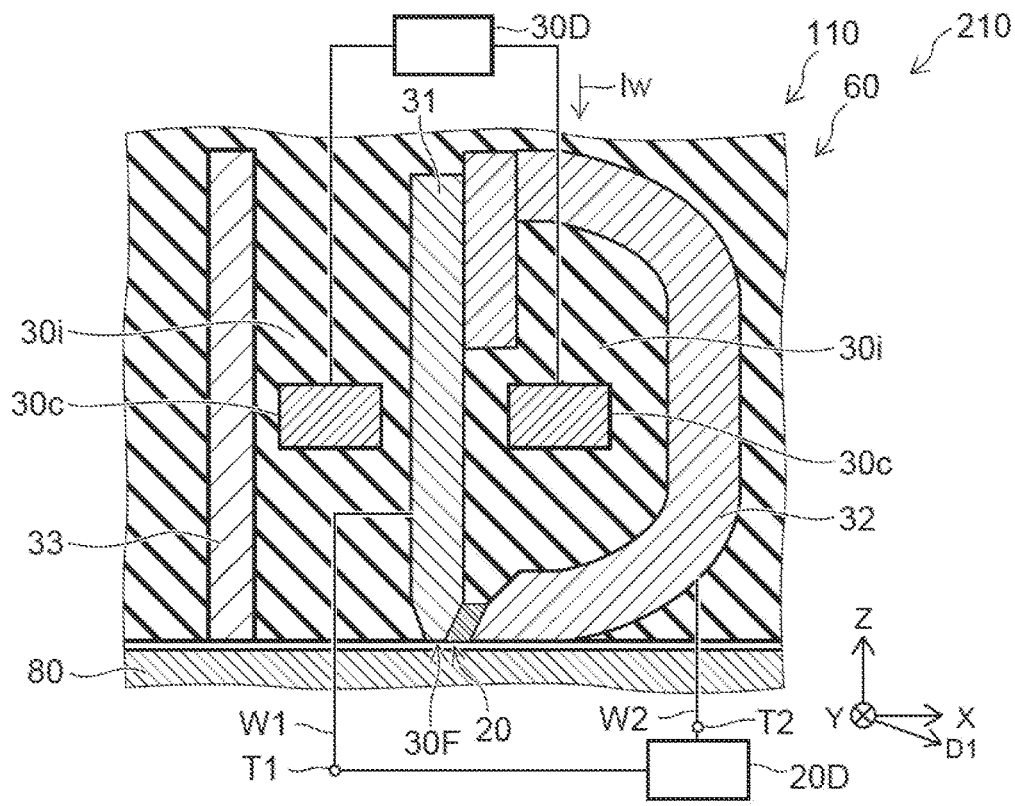
FIG. 2 is a schematic cross-sectional view illustrating the magnetic recording device according to the first embodiment.

FIG. 2 is a schematic cross-sectional view illustrating the magnetic recording device according to the first embodiment.

As shown in FIG. 2, the magnetic recording device 210 according to the first embodiment includes a magnetic head 110 and an electrical circuit 20D. The magnetic recording device 210 may include a magnetic recording medium 80. For example, the magnetic recording device 210 performs at least a recording operation. Information is recorded in the magnetic recording medium 80 by using the magnetic head 110 in the recording operation.

The magnetic head 110 includes a recording part 60. As described below, the magnetic head 110 may include a reproducing part. The recording part 60 includes a first magnetic pole 31, a second magnetic pole 32, and a stacked body 20. The stacked body 20 is located between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield. The first magnetic pole 31 may be the trailing shield; and the second magnetic pole 32 may be the major magnetic pole. Hereinbelow, the first magnetic pole 31 is taken to be the major magnetic pole; and the second magnetic pole 32 is taken to be the trailing shield.

The direction from the magnetic recording medium 80 toward the magnetic head 110 is taken as a Z-axis direction. One direction perpendicular to the Z-axis direction is taken as an X-axis direction. A direction perpendicular to the Z-axis direction and the X-axis direction is taken as a Y-axis direction. For example, the Z-axis direction corresponds to the height direction. For example, the X-axis direction corresponds to the down-track direction. For example, the Y-axis direction corresponds to the cross-track direction. The magnetic recording medium 80 and the magnetic head 110 move relatively along the down-track direction. A magnetic field (a recording magnetic field) that is generated from the magnetic head 110 is applied to the desired position of the magnetic recording medium 80. The magnetization of the desired position of the magnetic recording medium 80 is controlled to be in a direction corresponding to the recording magnetic field. Thereby, the information is recorded in the magnetic recording medium 80.

The direction from the first magnetic pole 31 toward the second magnetic pole 32 is taken as a first direction D1. The first direction D1 substantially corresponds to the X-axis direction. The first direction D1 may be tilted at a small angle with respect to the X-axis direction.

A coil 30c is provided as shown in FIG. 2. In the example, a portion of the coil 30c is between the first magnetic pole 31 and the second magnetic pole 32. A shield 33 is provided in the example. The first magnetic pole 31 is between the shield 33 and the second magnetic pole 32 in the X-axis direction. Another portion of the coil 30c is between the shield 33 and the first magnetic pole 31. An insulating portion 30i is provided between these multiple components.

As shown in FIG. 2, a recording current Iw is supplied from a recording circuit 30D to the coil 30c. A recording magnetic field that corresponds to the recording current Iw is applied from the first magnetic pole 31 to the magnetic recording medium 80.

As shown in FIG. 2, the first magnetic pole 31 includes a medium-facing surface 30F. The medium-facing surface 30F is, for example, an ABS (Air Bearing Surface). For example, the medium-facing surface 30F faces the magnetic recording medium 80. For example, the medium-facing surface 30F is along the X-Y plane.

As shown in FIG. 2, the electrical circuit 20D is electrically connected to the stacked body 20. In the example, the stacked body 20 is electrically connected to the first and second magnetic poles 31 and 32. A first terminal T1 and a second terminal T2 are provided in the magnetic head 110. The first terminal T1 is electrically connected to the stacked body 20 via first wiring W1 and the first magnetic pole 31. The second terminal T2 is electrically connected to the stacked body 20 via second wiring W2 and the second magnetic pole 32. For example, a current (e.g., a direct current) is supplied from the electrical circuit 20D to the stacked body 20.

As shown in FIG. 1, the stacked body 20 includes a first magnetic layer 21, a second magnetic layer 22, a third magnetic layer 23, a first nonmagnetic layer 41, a second nonmagnetic layer 42, and a third nonmagnetic layer 43. A fourth nonmagnetic layer 44 is provided in the example.

The second magnetic layer 22 is located between the first magnetic pole 31 and the first magnetic layer 21. The third magnetic layer 23 is located between the first magnetic pole 31 and the second magnetic layer 22. The first nonmagnetic layer 41 is located between the first magnetic layer 21 and the second magnetic pole 32. The second nonmagnetic layer 42 is located between the second magnetic layer 22 and the first magnetic layer 21. The third nonmagnetic layer 43 is located between the third magnetic layer 23 and the second magnetic layer 22. When the fourth nonmagnetic layer 44 is provided, the fourth nonmagnetic layer 44 is located between the first magnetic pole 31 and the third magnetic layer 23.

The first magnetic layer 21 includes at least one of Fe, Co, or Ni. The second magnetic layer 22 includes at least one of Fe, Co, or Ni. For example, the first magnetic layer 21 and the second magnetic layer 22 have positive spin polarization.

The third magnetic layer 23 includes a first element and a second element. The first element includes at least one of Fe, Co, or Ni. The second element includes at least one selected from the group consisting of Cr, V, Mn, Ti, and Sc. The second element is, for example, an added element. The ratio (e.g., the concentration) of the second element in the third magnetic layer 23 is, for example, not less than 1 atomic % and not more than 80 atomic %. For example, the third magnetic layer 23 has negative spin polarization.

The first magnetic layer 21 and the second magnetic layer 22 substantially do not include the second element described above. Or, the concentrations of the second element in the first and second magnetic layers 21 and 22 are less than the concentration of the second element in the third magnetic layer 23.

The first nonmagnetic layer 41 includes, for example, at least one selected from the group consisting of Cu, Ag, Au, Al, and Cr. For example, the first nonmagnetic layer 41 functions as a layer that transfers polarized spin.

The second nonmagnetic layer 42 includes, for example, at least one selected from the group consisting of Ta, Pt, W, Mo, Ir, Ru, Tb, Rh, Cr, and Pd. For example, the second nonmagnetic layer 42 functions as a layer that attenuates polarized spin.

The third nonmagnetic layer 43 includes at least one selected from the group consisting of Cu, Ag, Au, Al, and Cr. For example, the third nonmagnetic layer 43 functions as a layer that transfers polarized spin.

The fourth nonmagnetic layer 44 includes at least one selected from the group consisting of Cu, Ag, Au, Al, and Cr. For example, the fourth nonmagnetic layer 44 functions as a layer that transfers polarized spin.

As shown in FIG. 1, for example, a current jc1 that is supplied from the electrical circuit 20D (referring to FIG. 2) to the stacked body 20 has an orientation from the second magnetic pole 32 toward the first magnetic pole 31. The current jc1 has an orientation from the first magnetic layer 21 toward the second magnetic layer 22. An electron current je1 has an orientation from the first magnetic pole 31 toward the second magnetic pole 32.

For example, when the current jc1 is not supplied to the stacked body 20, the orientation of the magnetization of the first magnetic layer 21 is substantially the same as the orientation of the magnetization of the first magnetic pole 31 and the orientation of the magnetization of the second magnetic pole 32. A portion of the magnetic field (the recording magnetic field) emitted from the first magnetic pole 31 is oriented toward the magnetic recording medium 80. On the other hand, another portion of the magnetic field (the recording magnetic field) emitted from the first magnetic pole 31 passes through the stacked body 20 and enters the second magnetic pole 32 without being oriented toward the magnetic recording medium 80. Therefore, the proportion of the recording magnetic field emitted from the first magnetic pole 31 that is oriented toward the magnetic recording medium 80 is low.

When the current jc1 is supplied to the stacked body 20, the orientation of the magnetization of the first magnetic layer 21 is reversed with respect to the orientation of the magnetization of the first magnetic pole 31 and the orientation of the magnetization of the second magnetic pole 32. Therefore, the magnetic field (the recording magnetic field) that is emitted from the first magnetic pole 31 is not easily oriented toward the stacked body 20. Therefore, the proportion of the recording magnetic field emitted from the first magnetic pole 31 that is oriented toward the magnetic recording medium 80 is high compared to when the current jc1 is not supplied to the stacked body 20. The recording magnetic field that is emitted from the first magnetic pole 31 is effectively applied to the magnetic recording medium 80.

This phenomenon becomes more pronounced as the distance (the recording gap) between the first magnetic pole 31 and the second magnetic pole 32 is reduced. By using such a stacked body 20, good recording can be performed even when the recording gap is small. According to the first embodiment, the recording gap at which good recording is possible can be reduced. According to the first embodiment, a magnetic recording device can be provided in which the recording density can be increased.

On the other hand, in MAMR (Microwave Assisted Magnetic Recording), the recording is performed by locally controlling the magnetic properties of the magnetic recording medium 80 by applying, to the magnetic recording medium 80, a high frequency magnetic field generated from a stacked body including multiple magnetic layers. In MAMR, the high frequency magnetic field is generated by the oscillations of the magnetizations of the magnetic layers.

Conversely, according to the embodiment, the magnetization of the first magnetic layer 21 reverses with respect to the magnetization of the first magnetic pole 31 and the magnetization of the second magnetic pole 32. The magnetic field that is emitted from the first magnetic pole 31 is efficiently applied to the magnetic recording medium 80 by an operation that is different from MAMR.

An example of characteristics of the magnetic head 110 according to the embodiment will now be described.

Figure 3A:
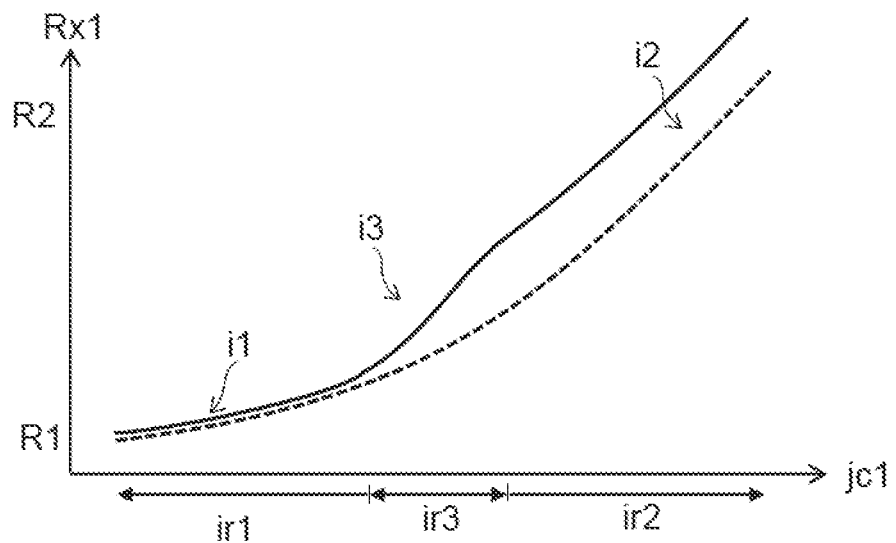
FIGS. 3A and 3B are schematic views illustrating characteristics of the magnetic recording device according to the embodiment.
Figure 3B:
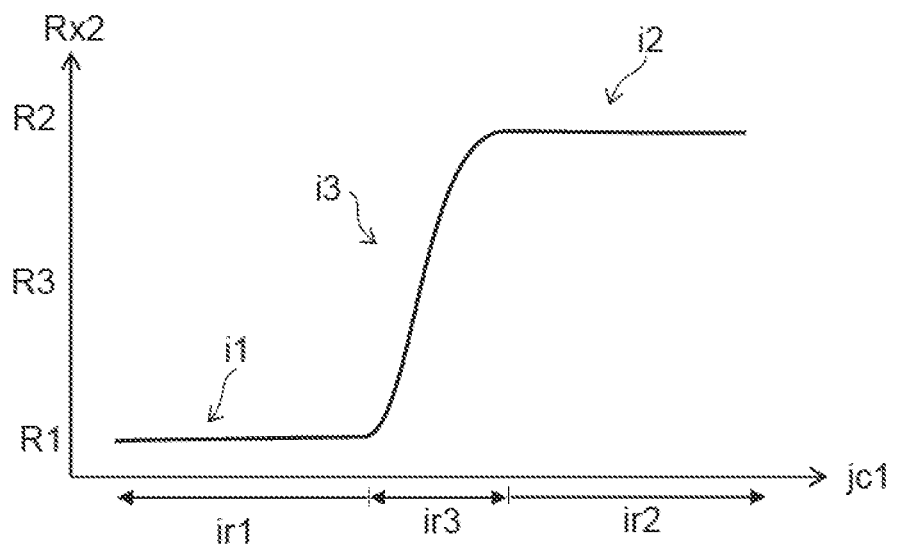

FIGS. 3A and 3B are schematic views illustrating characteristics of the magnetic recording device according to the embodiment.

These figures schematically show the relationship between the electrical resistance of the stacked body 20 and the magnitude of the current jc1 flowing in the stacked body 20 according to the embodiment. In these figures, the horizontal axis is the magnitude of the current jc1. The vertical axis of FIG. 3A is an electrical resistance Rx1 of the stacked body 20.

As shown in FIG. 3A, the electrical resistance Rx1 increases as the current jc1 increases. As shown in FIG. 3A, the magnitude of the current jc1 can be separated into a first current range ir1, a second current range ir2, and a third current range ir3. The third current range ir3 is between the first current range ir1 and the second current range ir2.

In the first and second current ranges ir1 and ir2, the electrical resistance Rx1 changes as a quadratic function of the magnitude of the current jc1. It is considered that this is caused by the temperature of the stacked body 20 increasing as the current jc1 increases.

The change of the electrical resistance Rx1 in the third current range ir3 is different from the effect of the temperature increase. It is considered that the change of the electrical resistance Rx1 in the third current range ir3 is due to a magnetoresistance effect based on the reversal rates of the magnetizations of the magnetic layers.

FIG. 3B shows the relationship between an electrical resistance Rx2 and the magnitude of the current jc1, in which the change of the quadratic function (the effect of the temperature) of FIG. 3A has been removed. When the effect of the quadratic function is removed as shown in FIG. 3B, the electrical resistance Rx2 is substantially constant in the first current range ir1. Or, compared to the third current range ir3, the electrical resistance Rx2 gradually changes in the first current range ir1. The electrical resistance Rx2 changes in the third current range ir3. The electrical resistance Rx2 is substantially constant in the second current range ir2. Or, compared to the third current range ir3, the electrical resistance Rx2 gradually changes in the second current range ir2.

For example, as shown in FIG. 3B, the electrical resistance Rx2 of the stacked body 20 is a first resistance R1 when the current jc1 flowing in the stacked body 20 is a first current i1. The first current i1 is in the first current range ir1.

As shown in FIG. 3B, the electrical resistance Rx2 of the stacked body 20 is a second resistance R2 when the current jc1 flowing in the stacked body 20 is a second current i2. The second current i2 is greater than the first current i1. The second current i2 is in the second current range ir2. The second resistance R2 is greater than the first resistance R1.

The electrical resistance Rx2 of the stacked body 20 is a third resistance R3 at a third current i3 that is between the first current i1 and the second current i2. The third current i3 is in the third current range ir3.

For example, the electrical resistance Rx2 substantially does not oscillate when the current jc1 is the first or second current i1 or i2. For example, the electrical resistance Rx2 oscillates when the current jc1 is the third current i3. The first current i1, the second current i2, and the third current i3 have orientations from the first magnetic layer 21 toward the second magnetic layer 22.

Figure 4A:
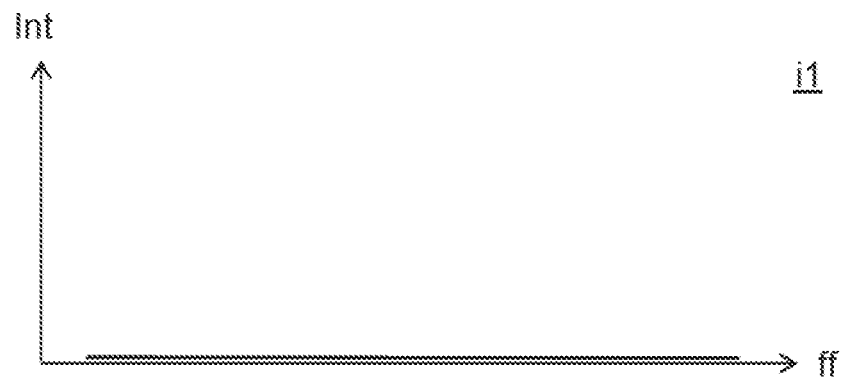
FIGS. 4A to 4C are schematic views illustrating characteristics of the magnetic recording device according to the embodiment.
Figure 4B:
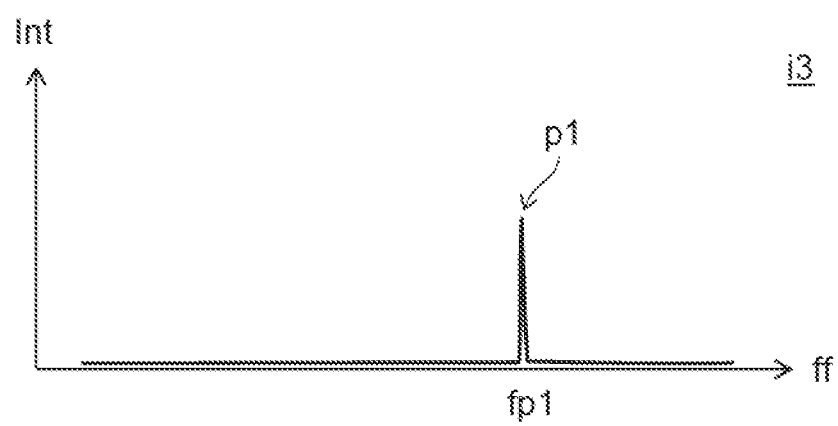
Figure 4C:
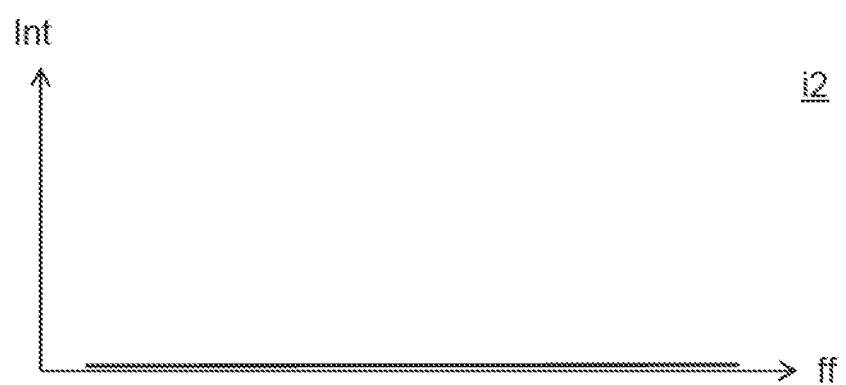

FIGS. 4A to 4C are schematic views illustrating characteristics of the magnetic recording device according to the embodiment.

These figures illustrate signals on which FFT (Fast Fourier Transform) processing of a portion of the signal of the electrical resistance Rx2 is performed. The signal of the electrical resistance Rx2 includes a component (a high frequency component) that temporally changes, and a component (the component of the temporal average value) that substantially does not change temporally. The temporally-changing component of the electrical resistance Rx2 is processed by the FFT processing. In these figures, the horizontal axis is a frequency ff. The vertical axis is an intensity Int of the signal. FIG. 4A corresponds to when the current jc1 is the first current i1. FIG. 4B corresponds to when the current jc1 is the third current i3. FIG. 4C corresponds to when the current jc1 is the second current i2.

As shown in FIG. 4B, when the current jc1 is the third current i3, a peak p1 is observed at one frequency fp1. The peak corresponds to a high frequency oscillation being generated by the stacked body 20.

As shown in FIGS. 4A and 4C, the peak p1 is not distinctly observed when the current jc1 is the first or second current i1 or i2. For these currents, a magnetization oscillation that is effective for MAMR is substantially not generated.

Thus, the electrical resistance Rx2 of the stacked body 20 oscillates when the current jc1 flowing in the stacked body 20 is the third current i3 that is between the first current i1 and the second current i2.

According to the embodiment, the recording operation is performed using the stacked body 20 that has such characteristics.

According to the embodiment, the electrical circuit 20D is configured to supply the second current i2 described above to the stacked body 20 in the recording operation of using the magnetic head 110 to record the information in the magnetic recording medium 80. Compared to when the recording operation is performed without supplying the second current i2, the amount of the recording magnetic field oriented from the first magnetic pole 31 toward the magnetic recording medium 80 can be increased by performing the recording operation of supplying the recording current Iw from the recording circuit 30D to the coil while supplying a second current i2 such as that described above. The recording gap at which good recording is possible can be reduced. According to the embodiment, a magnetic recording device can be provided in which the recording density can be increased.

An example of characteristics of a magnetic recording device will now be described.

Figure 5:
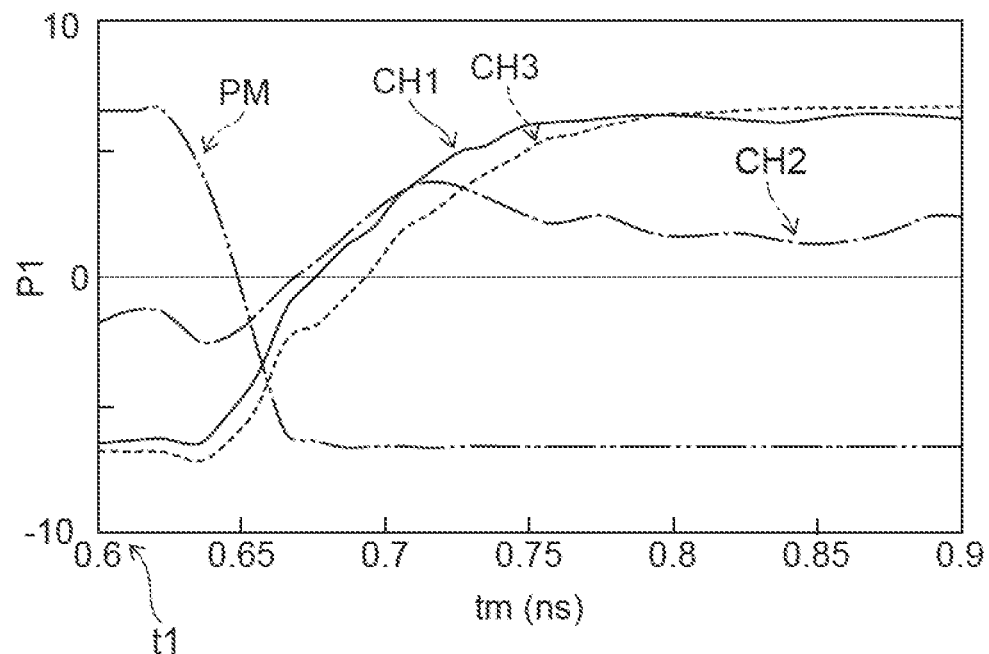
FIG. 5 is a schematic view illustrating characteristics of the magnetic recording device.

FIG. 5 is a schematic view illustrating characteristics of the magnetic recording device.

FIG. 5 illustrates simulation results of characteristics of a magnetic head including the stacked body 20 having a first condition CH1, a second condition CH2, and a third condition CH3. As the first condition CH1, the configuration of the magnetic head 110 described above is applied. Namely, for example, the second nonmagnetic layer 42 is Ta; and the second nonmagnetic layer 42 attenuates polarized spin.

As the second condition CH2, for example, the second nonmagnetic layer 42 is Cu; and the second nonmagnetic layer 42 transfers polarized spin. Otherwise, the configuration of the second condition CH2 is similar to the configuration of the first condition CH1.

As the third condition CH3, the second nonmagnetic layer 42 is not provided, and the first magnetic layer 21 and the second magnetic layer 22 contact each other. Otherwise, the configuration of the third condition CH3 is similar to the configuration of the first condition CH1.

The horizontal axis of FIG. 5 is a time tm. The polarity of the recording current Iw reverses at a first time t1. The vertical axis of FIG. 5 is a parameter P1 corresponding to the reversal amount of the magnetization. The parameter P1 corresponds to the reversal amount of a magnetization existing between the first magnetic pole 31 and the second magnetic pole 32 for the first to third conditions CH1, CH2, and CH3.

FIG. 5 also illustrates a characteristic PM of the orientation of the magnetization of the first magnetic pole 31. For the characteristic PM, the parameter P1 corresponds to the orientation of the magnetization of the first magnetic pole 31. In the example of FIG. 5, the polarity of the recording current Iw reverses at the first time t1 (when the time tm is 0.60 ns). When the time tm is 0.62 ns, the orientation of the magnetization of the first magnetic pole 31 starts to change. When the time tm is 0.67 ns, the change of the orientation of the magnetization of the first magnetic pole 31 substantially ends.

As shown in FIG. 5, the absolute value of the parameter P1 is small for the second condition CH2. For the second condition CH2, a magnetization that exists between the first magnetic pole 31 and the second magnetic pole 32 does not distinctly reverse with respect to the magnetization of the first magnetic pole 31.

For the first condition CH1 and the third condition CH3 as shown in FIG. 5, it can be seen that a magnetization that exists between the first magnetic pole 31 and the second magnetic pole 32 substantially reverses with respect to the magnetization of the first magnetic pole 31. The change of the parameter P1 for the first condition CH1 is faster than the change of the parameter P1 for the third condition CH3. A fast magnetization reversal is obtained for the first condition CH1. For the first condition CH1, a high responsiveness with respect to the change of the magnetization of the first magnetic pole 31 is obtained because the magnetization of the first magnetic layer 21 quickly changes. For the first condition CH1, for example, the BER (Bit Error Rate) can be effectively reduced in practical conditions of use.

According to the first embodiment, the BER can be effectively reduced, and the recording gap at which good recording is possible can be reduced. According to the embodiment, a magnetic recording device can be provided in which the recording density can be increased.

According to the embodiment, a high recording capacity in a high-speed recording operation at a high frequency can be obtained. The recording density can be more effectively improved.

Figure 6:
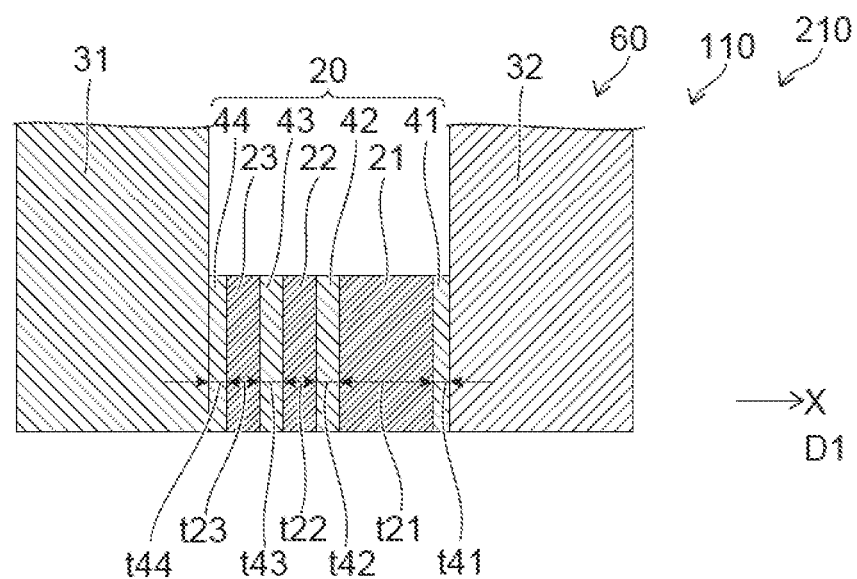
FIG. 6 is a schematic cross-sectional view illustrating a portion of the magnetic recording device according to the first embodiment.

FIG. 6 is a schematic cross-sectional view illustrating a portion of the magnetic recording device according to the first embodiment.

FIG. 6 illustrates the magnetic head 110.

As shown in FIG. 6, the first magnetic layer 21 has a thickness t21. The second magnetic layer 22 has a thickness t22. The third magnetic layer 23 has a thickness t23. The first nonmagnetic layer 41 has a thickness t41. The second nonmagnetic layer 42 has a thickness t42. The third nonmagnetic layer 43 has a thickness t43. The fourth nonmagnetic layer 44 has a thickness t44. These thicknesses are lengths along the first direction D1. As described above, the first direction D1 may be oblique to the X-axis direction.

In the magnetic head 110, the thickness t21 of the first magnetic layer 21 is, for example, not less than 2 nm and not more than 10 nm. Because the thickness t21 is not less than 2 nm, for example, the magnetic field that is oriented toward the magnetic recording medium 80 can be effectively increased. Because the thickness t21 is not more than 8 nm, for example, an efficient magnetization reversal is easily obtained.

In the magnetic head 110, the thickness t22 of the second magnetic layer 22 is, for example, not less than 2 nm and not more than 4 nm. When the thickness t22 is not less than 2 nm, a higher gain is easily obtained in a high-speed operation. Because the thickness t22 is not more than 4 nm, stable operations are easily obtained.

In the magnetic head 110, the thickness t23 of the third magnetic layer 23 is, for example, not less than 2 nm and not more than 5 nm. When the thickness t23 is not less than 2 nm, for example, the electrons that pass through the third magnetic layer 23 easily spin. Because the thickness t23 is not more than 5 nm, for example, the magnetization of the third magnetic layer 23 easily stabilizes.

In the magnetic head 110, the thickness t41 of the first nonmagnetic layer 41 is, for example, not less than 1 nm and not more than 5 nm. When the thickness t41 is in this range, for example, the electrons that are spin-polarized by the second magnetic pole 32 easily reach the first magnetic layer 21.

In the magnetic head 110, the thickness t42 of the second nonmagnetic layer 42 is, for example, not less than 1 nm and not more than 5 nm. Because the thickness t42 is in this range, for example, a higher gain is easily obtained.

In the magnetic head 110, the thickness t43 of the third nonmagnetic layer 43 is, for example, not less than 1 nm and not more than 5 nm. Because the thickness t43 is in this range, for example, the magnetization of the second magnetic layer 22 and the magnetization of the third magnetic layer 23 are easily mutually-stabilized.

In the magnetic head 110, the thickness t44 of the fourth nonmagnetic layer 44 is, for example, not less than 1 nm and not more than 5 nm. Because the thickness t44 is in this range, for example, the magnetization of the third magnetic layer 23 easily stabilizes.

According to the embodiment, for example, the first nonmagnetic layer 41 contacts the first magnetic layer 21 and the second magnetic pole 32. For example, the second nonmagnetic layer 42 contacts the second magnetic layer 22 and the first magnetic layer 21. For example, the third nonmagnetic layer 43 contacts the third magnetic layer 23 and the second magnetic layer 22. For example, the fourth nonmagnetic layer 44 contacts the first magnetic pole 31 and the third magnetic layer 23.

Figure 7:
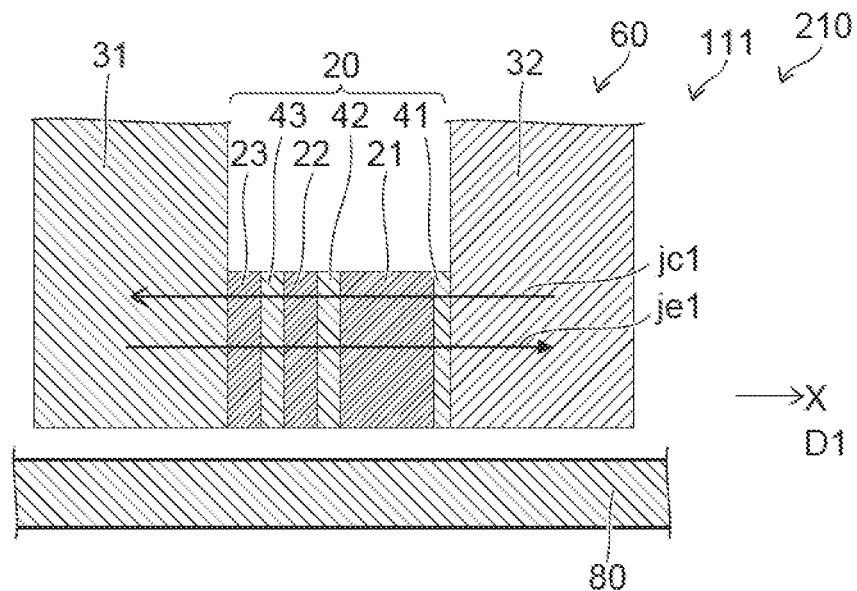
FIG. 7 is a schematic cross-sectional view illustrating a portion of the magnetic recording device according to the first embodiment.

FIG. 7 is a schematic cross-sectional view illustrating a portion of the magnetic recording device according to the first embodiment.

As shown in FIG. 7, the fourth nonmagnetic layer 44 is not provided in a magnetic head 111 according to the first embodiment. In the magnetic head 111, the first magnetic pole 31 contacts the third magnetic layer 23. Otherwise, the configuration of the magnetic head 111 may be similar to the configuration of the magnetic head 110.

In the magnetic head 111 as well, a fast magnetization reversal is obtained. The BER can be effectively reduced, and the recording gap at which good recording is possible can be reduced. According to the embodiment, a magnetic recording device can be provided in which the recording density can be increased.

In the magnetic head 110 and the magnetic head 111, it is favorable for the third nonmagnetic layer 43 to include Cr. Thereby, for example, the magnetization of the second magnetic layer 22 stabilizes more easily.

Second Embodiment

An example according to a second embodiment will now be described. In the following description, a description of portions similar to the first embodiment is omitted as appropriate.

Figure 8:
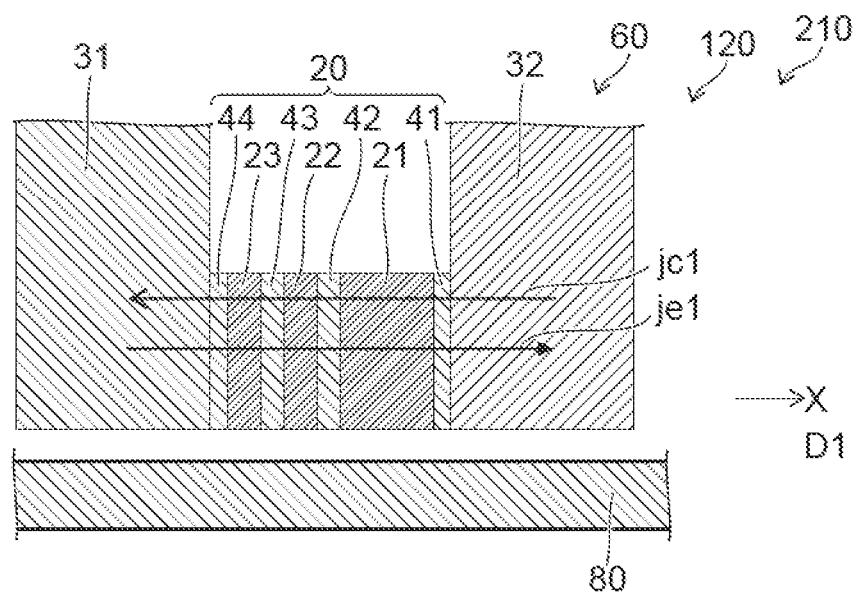
FIG. 8 is a schematic cross-sectional view illustrating a portion of a magnetic recording device according to the second embodiment.

FIG. 8 is a schematic cross-sectional view illustrating a portion of a magnetic recording device according to the second embodiment.

As shown in FIG. 8, the magnetic recording device 210 according to the second embodiment includes a magnetic head 120, the magnetic recording medium 80, and the electrical circuit 20D (referring to FIG. 2). In the magnetic head 120 as well, the stacked body 20 includes the first magnetic layer 21, the second magnetic layer 22, the third magnetic layer 23, the first nonmagnetic layer 41, the second nonmagnetic layer 42, and the third nonmagnetic layer 43. The fourth nonmagnetic layer 44 is provided in the example. In the magnetic head 120 as well, the second magnetic layer 22 is located between the first magnetic pole 31 and the first magnetic layer 21. The third magnetic layer 23 is located between the first magnetic pole 31 and the second magnetic layer 22. The first nonmagnetic layer 41 is located between the first magnetic layer 21 and the second magnetic pole 32. The second nonmagnetic layer 42 is located between the second magnetic layer 22 and the first magnetic layer 21. The third nonmagnetic layer 43 is located between the third magnetic layer 23 and the second magnetic layer 22. When the fourth nonmagnetic layer 44 is provided, the fourth nonmagnetic layer 44 is located between the first magnetic pole 31 and the third magnetic layer 23.

In the magnetic head 120, the first magnetic layer 21 includes the first element that includes at least one of Fe, Co, or Ni, and includes the second element that includes at least one selected from the group consisting of Cr, V, Mn, Ti, and Sc. For example, the first magnetic layer 21 has negative polarization. The concentration of the second element in the first magnetic layer 21 is, for example, not less than 1 atomic % and not more than 80 atomic %.

In the magnetic head 120, the second magnetic layer 22 includes at least one of Fe, Co, or Ni. The second magnetic layer 22 substantially does not include the second element described above. Or, the concentration of the second element in the second magnetic layer 22 is less than the concentration of the second element in the first magnetic layer 21. For example, the second magnetic layer 22 has positive polarization.

In the magnetic head 120, the third magnetic layer 23 includes a third element that includes at least one of Fe, Co, or Ni, and includes a fourth element that includes at least one selected from the group consisting of Cr, V, Mn, Ti, and Sc. For example, the third magnetic layer 23 has negative polarization. The concentration of the fourth element in the third magnetic layer 23 is, for example, not less than 1 atomic % and not more than 80 atomic %. The second magnetic layer 22 substantially does not include the fourth element described above. Or, the concentration of the fourth element in the second magnetic layer 22 is less than the concentration of the fourth element in the third magnetic layer 23.

In the magnetic head 120, for example, the first nonmagnetic layer 41 includes at least one selected from the group consisting of Cu, Ag, Au, Al, and Cr. In the magnetic head 120, for example, the first nonmagnetic layer 41 functions as a layer that transfers polarized spin.

In the magnetic head 120, for example, the second nonmagnetic layer 42 includes at least one selected from the group consisting of Cu, Ag, Au, Al, and Cr. In the magnetic head 120, for example, the second nonmagnetic layer 42 functions as a layer that transfers polarized spin.

In the magnetic head 120, for example, the third nonmagnetic layer 43 includes at least one selected from the group consisting of Cu, Ag, Au, Al, and Cr. In the magnetic head 120, for example, the third nonmagnetic layer 43 functions as a layer that transfers polarized spin.

In the magnetic head 120, the fourth nonmagnetic layer 44 may be provided between the first magnetic pole 31 and the third magnetic layer 23. The fourth nonmagnetic layer 44 includes, for example, at least one selected from the group consisting of Cu, Ag, Au, Al, and Cr. In the magnetic head 120, for example, the fourth nonmagnetic layer 44 functions as a layer that transfers polarized spin.

For example, the first nonmagnetic layer 41 may contact the first magnetic layer 21 and the second magnetic pole 32. The second nonmagnetic layer 42 may contact the second magnetic layer 22 and the first magnetic layer 21. The third nonmagnetic layer 43 may contact the third magnetic layer 23 and the second magnetic layer 22. The fourth nonmagnetic layer 44 may contact the first magnetic pole 31 and the third magnetic layer 23.

In the magnetic head 120 as well, the operations described with reference to FIGS. 3A and 3B may be performed. In the magnetic head 120 as well, as shown in FIG. 3B, the electrical resistance Rx2 of the stacked body 20 is the first resistance R1 when the current jc1 flowing in the stacked body 20 is the first current i1. The first current i1 is in the first current range ir1.

In the magnetic head 120 as well, as shown in FIG. 3B, the electrical resistance Rx2 of the stacked body 20 is the second resistance R2 when the current jc1 flowing in the stacked body 20 is the second current i2. The second current i2 is greater than the first current i1. The second current i2 is in the second current range ir2. The second resistance R2 is greater than the first resistance R1.

The electrical resistance Rx2 of the stacked body 20 is the third resistance R3 at the third current i3 that is between the first current i1 and the second current i2. The third current i3 is in the third current range ir3.

In the magnetic head 120 as well, for example, the electrical resistance Rx2 substantially does not oscillate when the current jc1 is the first or second current i1 or i2. For example, the electrical resistance Rx2 oscillates when the current jc1 is the third current i3. The first current i1, the second current i2, and the third current i3 have orientations from the first magnetic layer 21 toward the second magnetic layer 22.

According to the second embodiment, the electrical circuit 20D is configured to supply the second current i2 described above to the stacked body 20 in the recording operation of using the magnetic head 120 to record the information in the magnetic recording medium 80. Compared to when the recording operation is performed without supplying the second current i2, the amount of the recording magnetic field oriented from the first magnetic pole 31 toward the magnetic recording medium 80 can be increased by performing the recording operation of supplying the recording current Iw from the recording circuit 30D to the coil while supplying a second current i2 such as that described above. The recording gap at which good recording is possible can be reduced. According to the embodiment, a magnetic recording device can be provided in which the recording density can be increased.

An example of characteristics of a magnetic recording device will now be described.

Figure 9:
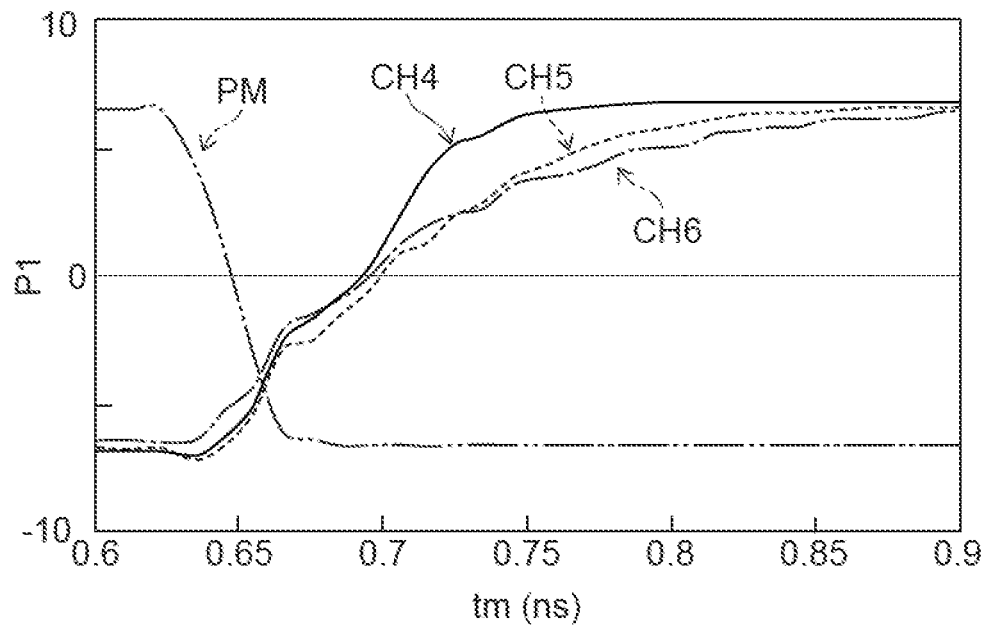
FIG. 9 is a schematic view illustrating characteristics of the magnetic recording device.

FIG. 9 is a schematic view illustrating characteristics of the magnetic recording device.

FIG. 9 illustrates simulation results of characteristics of a magnetic head including the stacked body 20 having a fourth condition CH4, a fifth condition CH5, and a sixth condition CH6. As the fourth condition CH4, the configuration of the magnetic head 120 described above is applied. Namely, for example, the second nonmagnetic layer 42 is Cu; and the second nonmagnetic layer 42 transfers polarized spin.

As the fifth condition CH5, for example, the second nonmagnetic layer 42 is Ta; and the second nonmagnetic layer 42 attenuates polarized spin. Otherwise, the configuration of the fifth condition CH5 is similar to the configuration of the fourth condition CH4.

As the sixth condition CH6, the second nonmagnetic layer 42 is not provided, and the first magnetic layer 21 and the second magnetic layer 22 contact each other. Otherwise, the configuration of the sixth condition CH6 is similar to the configuration of the fourth condition CH4.

The horizontal axis of FIG. 9 is the time tm. The polarity of the recording current Iw reverses at the first time t1 (when the time tm is 0.60 ns (referring to FIG. 5)). The vertical axis of FIG. 9 is the parameter P1 that corresponds to the reversal amount of the magnetization. The parameter P1 corresponds to the reversal amount of a magnetization existing between the first magnetic pole 31 and the second magnetic pole 32 for the fourth condition CH4, the fifth condition CH5, and the sixth condition CH6.

FIG. 9 also illustrates the characteristic PM of the orientation of the magnetization of the first magnetic pole 31. For the characteristic PM, the parameter P1 corresponds to the orientation of the magnetization of the first magnetic pole 31. In the example of FIG. 9, the polarity of the recording current Iw reverses at the first time t1 (when the time tm is 0.60 ns). When the time tm is 0.62 ns, the orientation of the magnetization of the first magnetic pole 31 starts to change. When the time tm is 0.67 ns, the change of the orientation of the magnetization of the first magnetic pole 31 substantially ends.

As shown in FIG. 9, when the time tm is equal to or greater than 0.7 ns, the parameter P1 is larger for the fourth condition CH4 than for the fifth condition CH5 and the sixth condition CH6. For the fourth condition CH4, a magnetization that exists between the first magnetic pole 31 and the second magnetic pole 32 substantially reverses with respect to the magnetization of the first magnetic pole 31. For the fourth condition CH4, a magnetic body that has a large magnetization volume can be quickly reversed. In particular, for the fourth condition CH4, the OW (Over Write) characteristic of the magnetic recording can be improved.

According to the second embodiment, the configuration of the magnetic head 120 described above is applied. For example, even at a relatively high recording frequency, the recording capacity is effectively improved thereby, and the recording characteristics are improved. According to the second embodiment, a magnetic recording device can be provided in which the recording density can be increased.

In the magnetic head 120, the first to third magnetic layers 21 to 23 respectively have the thicknesses t21 to t23 (referring to FIG. 6). In the magnetic head 120, the first to fourth nonmagnetic layers 41 to 44 respectively have the thicknesses t41 to t44 (referring to FIG. 6).

In the magnetic head 120, the thickness t21 of the first magnetic layer 21 is, for example, not less than 2 nm and not more than 10 nm. Because the thickness t21 is not less than 2 nm, for example, the magnetic field that is oriented toward the magnetic recording medium 80 can be effectively increased. Because the thickness t21 is not more than 8 nm, for example, an efficient magnetization reversal is easily obtained.

In the magnetic head 120, the thickness t22 of the second magnetic layer 22 is, for example, not less than 2 nm and not more than 4 nm. When the thickness t22 is not less than 2 nm, a higher gain is easily obtained in a high-speed operation. Because the thickness t22 is not more than 4 nm, stable operations are easily obtained.

In the magnetic head 120, the thickness t23 of the third magnetic layer 23 is, for example, not less than 2 nm and not more than 5 nm. When the thickness t23 is not less than 2 nm, for example, the electrons that pass through the third magnetic layer 23 easily have spin polarization. Because the thickness t23 is not more than 5 nm, for example, the magnetization of the third magnetic layer 23 easily stabilizes.

In the magnetic head 120, the thickness t41 of the first nonmagnetic layer 41 is, for example, not less than 1 nm and not more than 5 nm. When the thickness t41 is in this range, for example, the spin can be effectively transferred.

In the magnetic head 120, the thickness t42 of the second nonmagnetic layer 42 is, for example, not less than 1 nm and not more than 5 nm. When the thickness t42 is in this range, for example, the spin can be effectively transferred.

In the magnetic head 120, the thickness t43 of the third nonmagnetic layer 43 is, for example, not less than 1 nm and not more than 5 nm. When the thickness t43 is in this range, for example, the spin can be effectively transferred.

In the magnetic head 120, the thickness t44 of the fourth nonmagnetic layer 44 is, for example, not less than 1 nm and not more than 5 nm. When the thickness t44 is in this range, for example, the spin can be effectively transferred.

Figure 10:
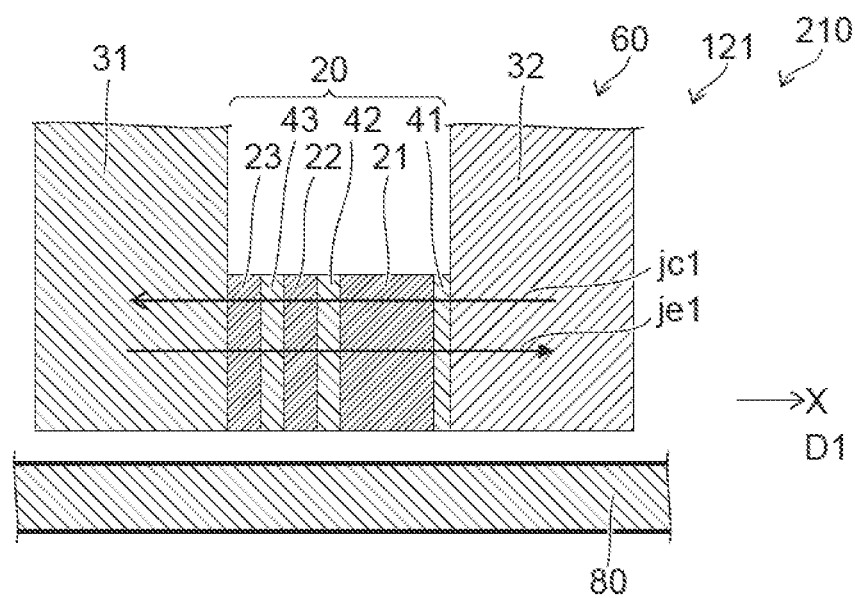
FIG. 10 is a schematic cross-sectional view illustrating a portion of a magnetic recording device according to the second embodiment.

FIG. 10 is a schematic cross-sectional view illustrating a portion of a magnetic recording device according to the second embodiment.

As shown in FIG. 10, the fourth nonmagnetic layer 44 is not provided in a magnetic head 121 according to the second embodiment. In the magnetic head 121, the first magnetic pole 31 contacts the third magnetic layer 23. Otherwise, the configuration of the magnetic head 121 may be similar to the configuration of the magnetic head 120.

In the magnetic head 121 as well, a magnetization that exists between the first magnetic pole 31 and the second magnetic pole 32 reverses with respect to the magnetization of the first magnetic pole 31. A magnetic body that has a large magnetization volume can be quickly reversed. According to the second embodiment, a magnetic recording device can be provided in which the recording density can be increased.

In the magnetic head 120 and the magnetic head 121, it is favorable for the second nonmagnetic layer 42 and the third nonmagnetic layer 43 to include Cr. For example, the transferred spin amount is more easily improved thereby.

An example of the magnetic recording medium 80 and the magnetic head included in the magnetic recording device 210 according to the embodiment will now be described. In the description recited below, the magnetic heads (the magnetic heads 110, 111, 120, and 121, etc.) and modifications of the magnetic heads according to the first and second embodiments are applicable.

Figure 11:
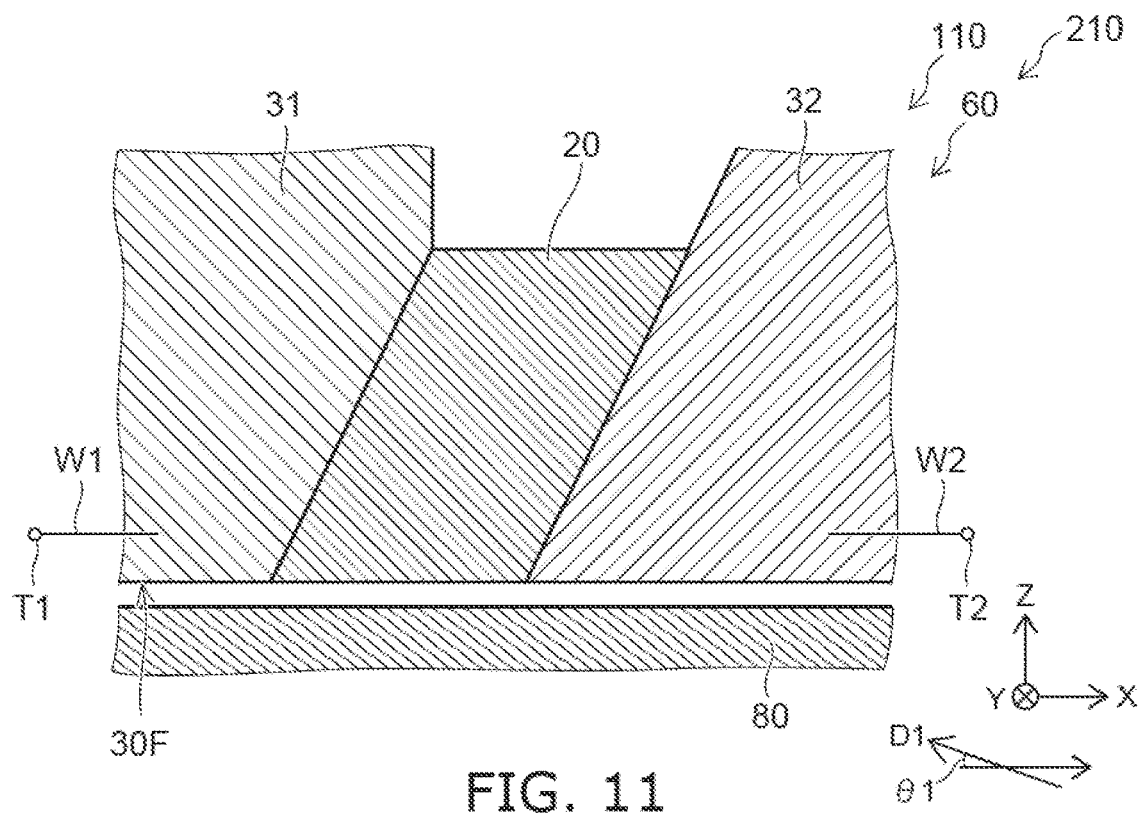
FIG. 11 is a schematic cross-sectional view illustrating the magnetic head according to the embodiment.

FIG. 11 is a schematic cross-sectional view illustrating the magnetic head according to the embodiment.

In the magnetic head (e.g., the magnetic head 110) according to the embodiment as shown in FIG. 11, the first direction D1 from the second magnetic pole 32 toward the first magnetic pole 31 may be oblique to the X-axis direction. The first direction D1 corresponds to the stacking direction of the stacked body 20. The X-axis direction is along the medium-facing surface 30F of the first magnetic pole 31. The angle between the first direction D1 and the medium-facing surface 30F is taken as an angle θ1. The angle θ1 is, for example, not less than 15 degrees and not more than 30 degrees. The angle θ1 may be 0 degrees.

When the first direction D1 is oblique to the X-axis direction, the thicknesses of the layers correspond to lengths along the first direction D1. The configuration in which the first direction D1 is oblique to the X-axis direction is applicable to any magnetic head according to the first or second embodiment.

Figure 12:
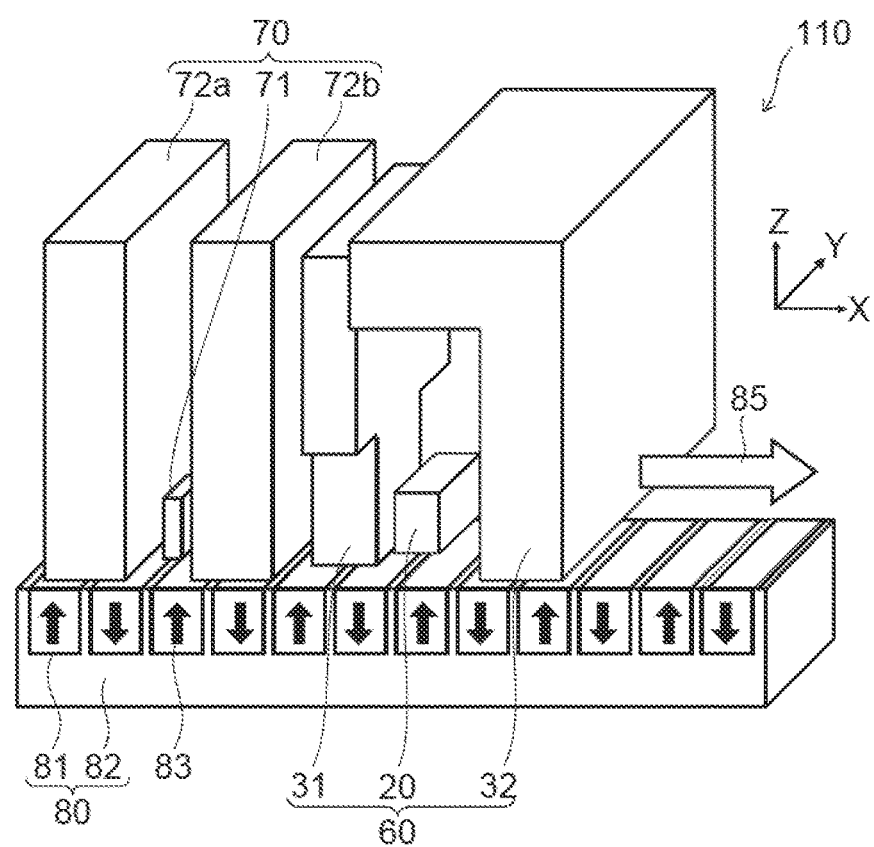
FIG. 12 is a schematic perspective view illustrating the magnetic recording device according to the embodiment.

FIG. 12 is a schematic perspective view illustrating the magnetic recording device according to the embodiment.

As shown in FIG. 12, the magnetic head (e.g., the magnetic head 110) according to the embodiment is used with the magnetic recording medium 80. In the example, the magnetic head 110 includes the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproduction magnetic shield 72a, a second reproduction magnetic shield 72b, and a magnetic reproducing element 71. The magnetic reproducing element 71 is located between the first reproduction magnetic shield 72a and the second reproduction magnetic shield 72b. The magnetic reproducing element 71 is configured to output a signal corresponding to the magnetization 83 of the magnetic recording layer 81.

As shown in FIG. 12, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

Figure 13:
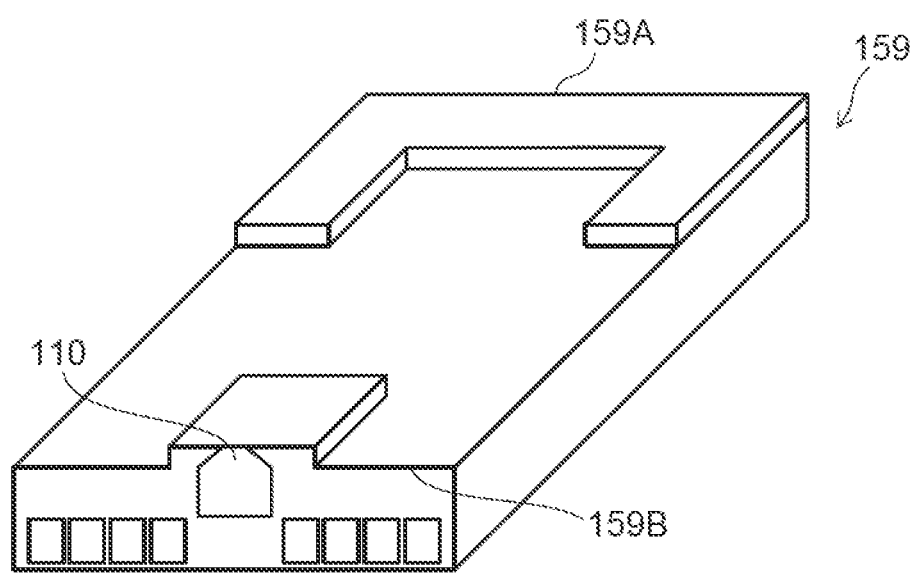
FIG. 13 is a schematic perspective view illustrating a portion of the magnetic recording device according to the embodiment.

FIG. 13 is a schematic perspective view illustrating a portion of the magnetic recording device according to the embodiment.

FIG. 13 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is located at the side surface of the air outflow side 159B of the head slider 159 or the like. Thereby, the magnetic head 110 moves relative to the magnetic recording medium while flying over or contacting the magnetic recording medium.

Figure 14:
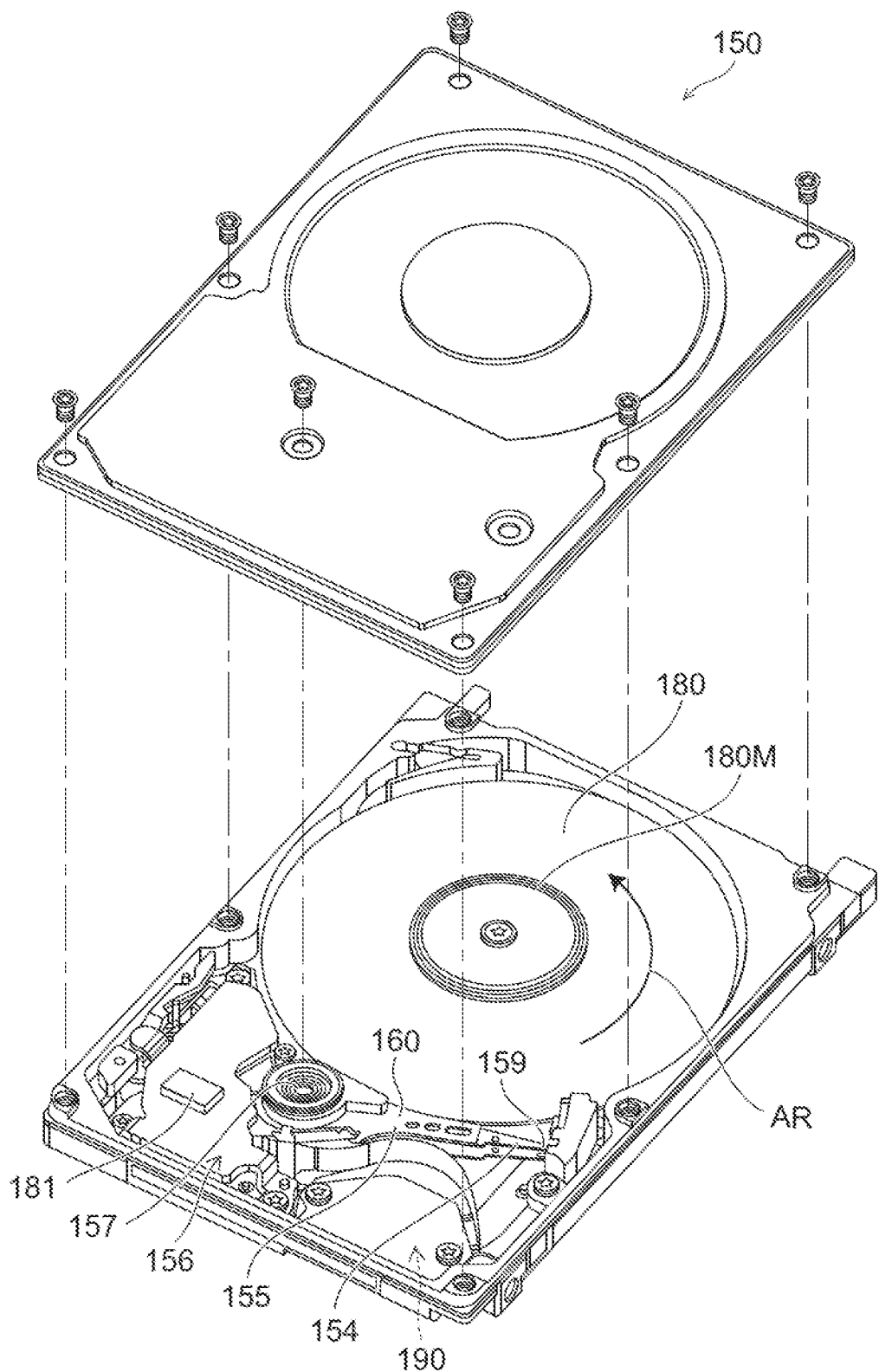
FIG. 14 is a schematic perspective view illustrating a magnetic recording device according to the embodiment.

FIG. 14 is a schematic perspective view illustrating a magnetic recording device according to the embodiment.

Figure 15A:
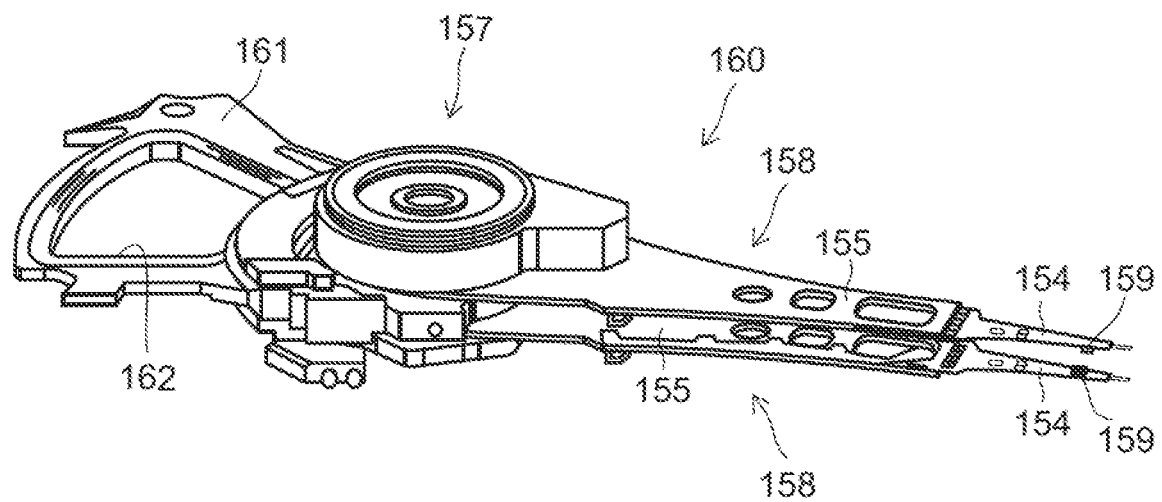
FIGS. 15A and 15B are schematic perspective views illustrating a portion of the magnetic recording device according to the embodiment.
Figure 15B:
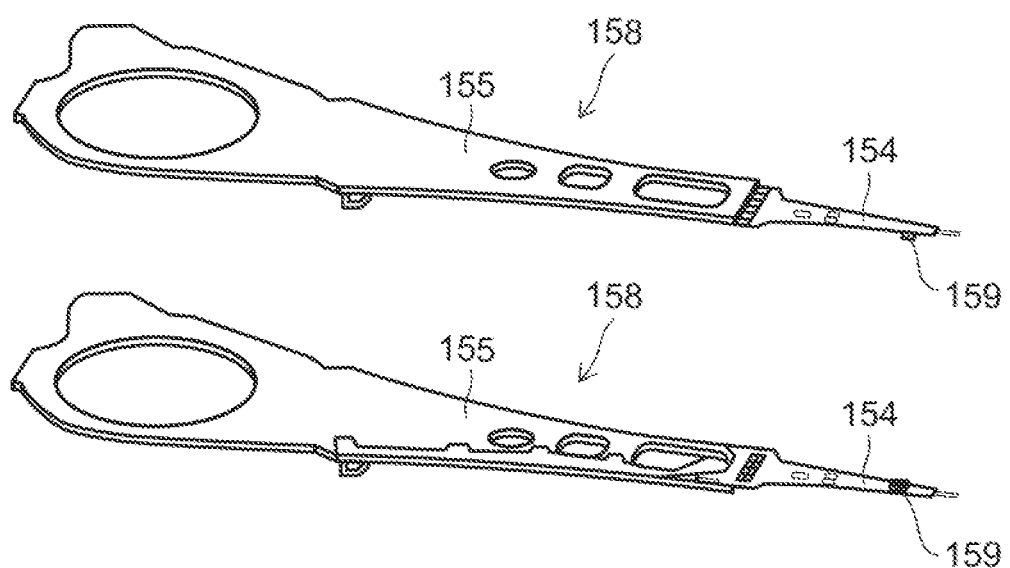

FIGS. 15A and 15B are schematic perspective views illustrating a portion of the magnetic recording device according to the embodiment.

As shown in FIG. 14, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. According to the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155.

The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is located between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 15A illustrates the configuration of a portion of the magnetic recording device and is an enlarged perspective view of a head stack assembly 160.

FIG. 15B is a perspective view illustrating a magnetic head assembly (a head gimbal assembly (HGA)) 158 that is a portion of the head stack assembly 160.

As shown in FIG. 15A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 15B, the head gimbal assembly 158 includes the arm 155 extending from the bearing part 157, and the suspension 154 extending from the arm 155.

The head slider 159 is provided at the tip of the suspension 154. The magnetic head according to the embodiment is provided in the head slider 159.

The magnetic head assembly (the head gimbal assembly) 158 according to the embodiment includes the magnetic head according to the embodiment, the head slider 159 in which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin-transfer torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

Embodiments may include the following configurations (e.g., technological proposals).

Configuration 1

A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic pole and the first magnetic layer,
a third magnetic layer provided between the first magnetic pole and the second magnetic layer,
a first nonmagnetic layer provided between the first magnetic layer and the second magnetic pole,
a second nonmagnetic layer provided between the second magnetic layer and the first magnetic layer, and
a third nonmagnetic layer provided between the third magnetic layer and the second magnetic layer,
the first magnetic layer including at least one of Fe, Co, or Ni,
the second magnetic layer including at least one of Fe, Co, or Ni,
the third magnetic layer including
a first element including at least one of Fe, Co, or Ni, and
a second element including at least one selected from the group consisting of Cr, V, Mn, Ti, and Sc,
the first magnetic layer and the second magnetic layer not including the second element, or concentrations of the second element in the first and second magnetic layers being less than a concentration of the second element in the third magnetic layer,
the first nonmagnetic layer including at least one selected from the group consisting of Cu, Ag, Au, Al, and Cr,
the second nonmagnetic layer including at least one selected from the group consisting of Ta, Pt, W, Mo, Ir, Ru, Tb, Rh, Cr, and Pd,
the third nonmagnetic layer including at least one selected from the group consisting of Cu, Ag, Au, Al, and Cr.

Configuration 2

The magnetic head according to Configuration 1, wherein the third nonmagnetic layer includes Cr.

Configuration 3

A magnetic head, comprising:
a first magnetic pole;
a second magnetic pole; and
a stacked body provided between the first magnetic pole and the second magnetic pole,
the stacked body including
a first magnetic layer,
a second magnetic layer provided between the first magnetic pole and the first magnetic layer,
a third magnetic layer provided between the first magnetic pole and the second magnetic layer,
a first nonmagnetic layer provided between the first magnetic layer and the second magnetic pole,
a second nonmagnetic layer provided between the second magnetic layer and the first magnetic layer, and
a third nonmagnetic layer provided between the third magnetic layer and the second magnetic layer,
the first magnetic layer including
a first element including at least one of Fe, Co, or Ni, and
a second element including at least one selected from the group consisting of Cr, V, Mn, Ti, and Sc,
the second magnetic layer including at least one of Fe, Co, or Ni,
the second magnetic layer not including the second element, or a concentration of the second element in the second magnetic layer being less than a concentration of the second element in the first magnetic layer,
the third magnetic layer including
a third element including at least one of Fe, Co, or Ni, and
a fourth element including at least one selected from the group consisting of Cr, V, Mn, Ti, and Sc,
the second magnetic layer not including the fourth element, or a concentration of the fourth element in the second magnetic layer being less than a concentration of the fourth element in the third magnetic layer,
the first nonmagnetic layer including at least one selected from the group consisting of Cu, Ag, Au, Al, and Cr,
the second nonmagnetic layer including at least one selected from the group consisting of Cu, Ag, Au, Al, and Cr,
the third nonmagnetic layer including at least one selected from the group consisting of Cu, Ag, Au, Al, and Cr.

Configuration 4

The magnetic head according to Configuration 3, wherein the second nonmagnetic layer and the third nonmagnetic layer include Cr.

Configuration 5

The magnetic head according to any one of Configurations 1 to 4, wherein
the first nonmagnetic layer contacts the first magnetic layer and the second magnetic pole,
the second nonmagnetic layer contacts the second magnetic layer and the first magnetic layer, and
the third nonmagnetic layer contacts the third magnetic layer and the second magnetic layer.

Configuration 6

The magnetic head according to any one of Configurations 1 to 5, wherein
the first magnetic pole contacts the third magnetic layer.

Configuration 7

The magnetic head according to any one of Configurations 1 to 6, wherein
the stacked body further includes a fourth nonmagnetic layer,
the fourth nonmagnetic layer is located between the first magnetic pole and the third magnetic layer, and
the fourth nonmagnetic layer includes at least one selected from the group consisting of Cu, Ag, Au, Al, and Cr.

Configuration 8

The magnetic head according to Configuration 7, wherein the fourth nonmagnetic layer contacts the first magnetic pole and the third magnetic layer.

Configuration 9

The magnetic head according to Configuration 7 or 8, wherein
a thickness of the fourth nonmagnetic layer is not less than 1 nm and not more than 5 nm.

Configuration 10

The magnetic head according to any one of Configurations 1 to 9, wherein a second current has an orientation from the first magnetic layer toward the second magnetic layer.

Configuration 11

The magnetic head according to any one of Configurations 1 to 10, wherein a thickness of the first nonmagnetic layer is not less than 1 nm and not more than 5 nm.

Configuration 12

The magnetic head according to any one of Configurations 1 to 11, wherein a thickness of the second nonmagnetic layer is not less than 1 nm and not more than 5 nm.

Configuration 13

The magnetic head according to any one of Configurations 1 to 12, wherein a thickness of the third nonmagnetic layer is not less than 1 nm and not more than 5 nm.

Configuration 14

The magnetic head according to any one of Configurations 1 to 13, wherein a thickness of the first magnetic layer is not less than 2 nm and not more than 8 nm.

Configuration 15

The magnetic head according to any one of Configurations 1 to 14, wherein a thickness of the second magnetic layer is not less than 2 nm and not more than 5 nm.

Configuration 16

The magnetic head according to any one of Configurations 1 to 15, wherein a thickness of the third magnetic layer is not less than 2 nm and not more than 5 nm.

Configuration 17

A magnetic recording device, comprising:

the magnetic head according to any one of Configurations 1 to 16;

a magnetic recording medium; and an electrical circuit, an electrical resistance of the stacked body being a first resistance when a current flowing in the stacked body is a first current, the electrical resistance of the stacked body being a second resistance when the current flowing in the stacked body is a second current, the second current being greater than the first current, the second resistance being greater than the first resistance, the electrical resistance of the stacked body oscillating when the current flowing in the stacked body is a third current, the third current being between the first current and the second current, the electrical circuit being configured to supply the second current to the stacked body in a recording operation of using the magnetic head to record information in the magnetic recording medium.

According to embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices such as magnetic heads, magnetic poles, second magnetic poles, stacked bodies, magnetic layers, nonmagnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:

a first magnetic pole;

a second magnetic pole; and a stacked body provided between the first magnetic pole and the second magnetic pole, the stacked body including a first magnetic layer, a second magnetic layer provided between the first magnetic pole and the first magnetic layer, a third magnetic layer provided between the first magnetic pole and the second magnetic layer, a first nonmagnetic layer provided between the first magnetic layer and the second magnetic pole, a second nonmagnetic layer provided between the second magnetic layer and the first magnetic layer, and a third nonmagnetic layer provided between the third magnetic layer and the second magnetic layer, the first magnetic layer including a first element including at least one of Fe, Co, or Ni, and a second element including at least one selected from the group consisting of Cr, V, Mn, Ti, and Sc, the second magnetic layer including at least one of Fe, Co, or Ni, the second magnetic layer not including the second element, or a concentration of the second element in the second magnetic layer being less than a concentration of the second element in the first magnetic layer, the third magnetic layer including a third element including at least one of Fe, Co, or Ni, and a fourth element including at least one selected from the group consisting of Cr, V, Mn, Ti, and Sc, the second magnetic layer not including the fourth element, or a concentration of the fourth element in the second magnetic layer being less than a concentration of the fourth element in the third magnetic layer, the first nonmagnetic layer including at least one selected from the group consisting of Cu, Ag, Au, Al, and Cr, the second nonmagnetic layer including at least one selected from the group consisting of Cu, Ag, Au, Al, and Cr, and the third nonmagnetic layer including at least one selected from the group consisting of Cu, Ag, Au, Al, and Cr.

2. The head according to claim 1, wherein
the second nonmagnetic layer and the third nonmagnetic layer include Cr.

3. The head according to claim 1, wherein
the first nonmagnetic layer contacts the first magnetic layer and the second magnetic pole,
the second nonmagnetic layer contacts the second magnetic layer and the first magnetic layer, and
the third nonmagnetic layer contacts the third magnetic layer and the second magnetic layer.

4. The head according to claim 1, wherein
the first magnetic pole contacts the third magnetic layer.

5. The head according to claim 1, wherein
the stacked body further includes a fourth nonmagnetic layer,
the fourth nonmagnetic layer is located between the first magnetic pole and the third magnetic layer, and
the fourth nonmagnetic layer includes at least one selected from the group consisting of Cu, Ag, Au, Al, and Cr.

6. The head according to claim 5, wherein
the fourth nonmagnetic layer contacts the first magnetic pole and the third magnetic layer.

7. The head according to claim 5, wherein
a thickness of the fourth nonmagnetic layer is not less than 1 nm and not more than 5 nm.

8. The head according to claim 1, wherein
a second current has an orientation from the first magnetic layer toward the second magnetic layer.

9. The head according to claim 1, wherein
a thickness of the first nonmagnetic layer is not less than 1 nm and not more than 5 nm.

10. The head according to claim 1, wherein
a thickness of the second nonmagnetic layer is not less than 1 nm and not more than 5 nm.

11. The head according to claim 1, wherein
a thickness of the third nonmagnetic layer is not less than 1 nm and not more than 5 nm.

12. The head according to claim 1, wherein
a thickness of the first magnetic layer is not less than 2 nm and not more than 8 nm.

13. The head according to claim 1, wherein
a thickness of the second magnetic layer is not less than 2 nm and not more than 5 nm.

14. The head according to claim 1, wherein
a thickness of the third magnetic layer is not less than 2 nm and not more than 5 nm.

15. A magnetic recording device, comprising:
the magnetic head according to claim 1;
a magnetic recording medium; and
an electrical circuit,
an electrical resistance of the stacked body being a first resistance when a current flowing in the stacked body is a first current,
the electrical resistance of the stacked body being a second resistance when the current flowing in the stacked body is a second current, the second current being greater than the first current, the second resistance being greater than the first resistance,
the electrical resistance of the stacked body oscillating when the current flowing in the stacked body is a third current, the third current being between the first current and the second current,
the electrical circuit being configured to supply the second current to the stacked body in a recording operation of using the magnetic head to record information in the magnetic recording medium.

\* \* \* \* \*